United States Patent [19]
Bauer et al.

[11] Patent Number: 5,772,710
[45] Date of Patent: Jun. 30, 1998

[54] AIR TREATING SYSTEM

[75] Inventors: Larry A. Bauer, Osage Beach; Bruce B. Atkinson, Lebanon; Bruce A. Mazor, Lebanon, all of Mo.; Anthony J. Coronati, Sidney, Ohio; Steven C. Hokky, Lebanon, Mo.

[73] Assignee: Copeland Corporation, Sidney, Ohio

[21] Appl. No.: 574,992

[22] Filed: Dec. 19, 1995

[51] Int. Cl.$^6$ .................................................. B01D 50/00
[52] U.S. Cl. ........................... 55/269; 55/321; 55/322; 55/343; 55/472; 55/DIG. 18; 95/268; 95/287; 95/288
[58] Field of Search ................. 95/39, 268, 288, 95/289, 273, 286, 287; 55/209, 267, 268, 269, 318, 320, 321, 322, 327, 467, 471, 472, 473, DIG. 18, DIG. 29, DIG. 46, 342, 343

[56] References Cited

U.S. PATENT DOCUMENTS

| | | | |
|---|---|---|---|
| 3,192,689 | 7/1965 | Smith | 55/342 |
| 3,260,189 | 7/1966 | Jensen | 55/269 |
| 3,261,147 | 7/1966 | Allander | 55/269 |
| 3,728,866 | 4/1973 | Layton | 55/DIG. 18 |
| 3,880,061 | 4/1975 | Hensiek et al. | 55/DIG. 29 |
| 4,108,051 | 8/1978 | Eakes | 55/DIG. 18 |
| 4,255,169 | 3/1981 | Leliaert et al. | 95/273 |
| 4,316,726 | 2/1982 | Hopper | 95/268 |
| 4,471,633 | 9/1984 | Tinsler | 62/295 |
| 4,576,619 | 3/1986 | Manning | 55/DIG. 18 |
| 4,662,899 | 5/1987 | Tandon | 95/273 |
| 4,747,857 | 5/1988 | Andrews | 55/269 |
| 5,004,483 | 4/1991 | Eller et al. | 95/273 |
| 5,090,972 | 2/1992 | Eller et al. | 95/273 |
| 5,154,742 | 10/1992 | Gault et al. | 55/269 |
| 5,223,005 | 6/1993 | Avondoglio | 95/280 |
| 5,342,433 | 8/1994 | Avondoglio | 95/282 |
| 5,413,619 | 5/1995 | Volk et al. | 95/268 |
| 5,481,087 | 1/1996 | Willemen | 55/269 |

OTHER PUBLICATIONS

"Copelaweld—Air–Cooled Condensing Units High Temoperature Models R–22", Copeland, prior to Dec. 19, 1995, 2 pages.

Grainger Catalog, "Evaporator Coils and Condensing Unit Accessories", prior to Dec. 19, 1995, 1 page.

"FDV/PDV Series", Aercology, Inc., prior to Dec. 19, 1995, 2 pages.

*Primary Examiner*—Duane Smith
*Attorney, Agent, or Firm*—Harness, Dickey & Pierce, P.L.C.

[57] ABSTRACT

An air treating system filters and dehumidifies contaminated air within an industrial plant. The air treating system includes a prefilter, a filter, a blower and an evaporator. A self-contained filtering unit directly communicates with a flume which receives fluid carrying contaminated particles from a machining center. Multiple self-contained filter and dehumidifier units are coupled with a single air conditioning compressor and condenser unit.

13 Claims, 3 Drawing Sheets

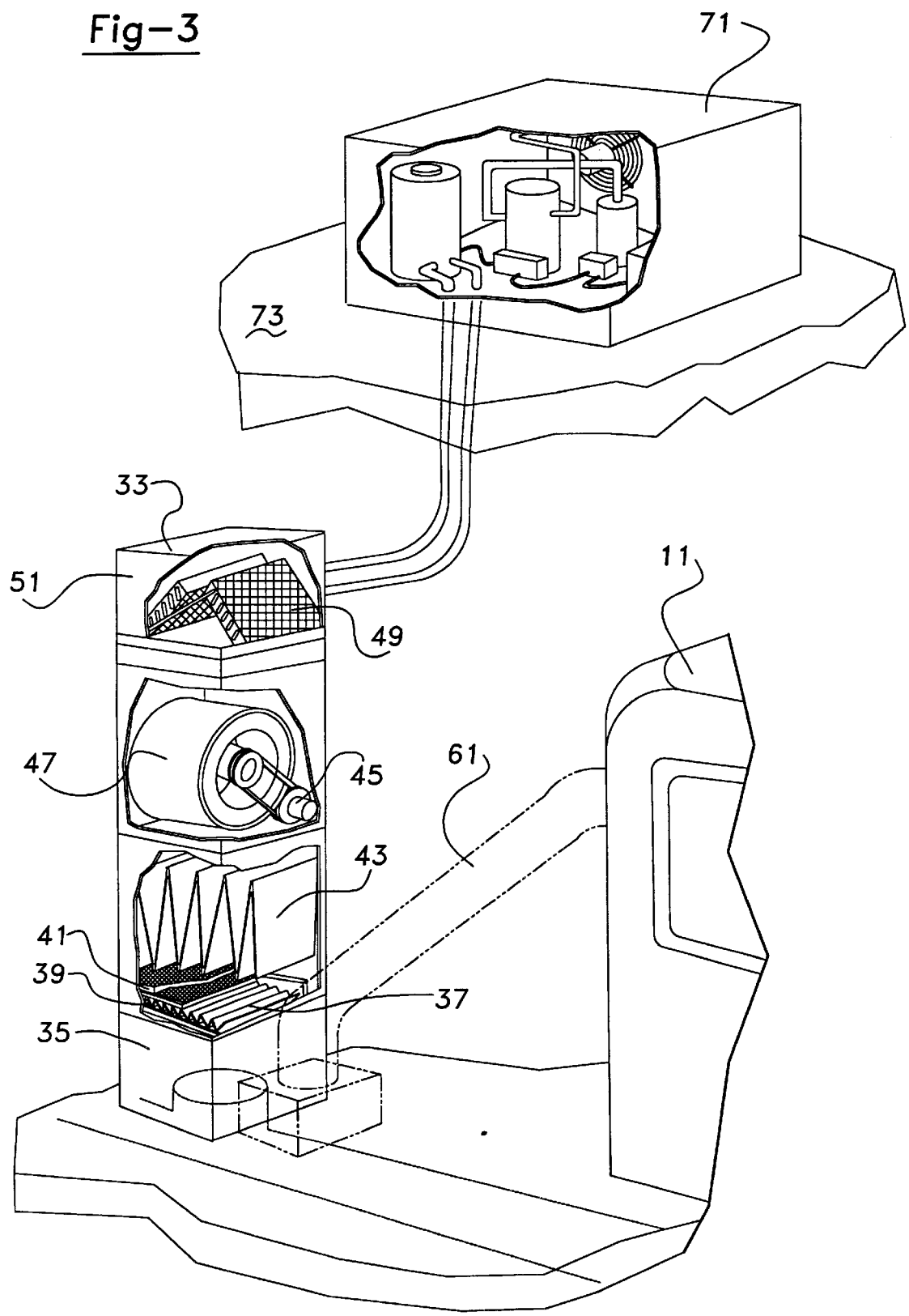

AIR TREATING SYSTEM

BACKGROUND AND SUMMARY OF THE INVENTION

This invention relates generally to air treating systems and more particularly to an industrial plant air treating system which filters and dehumidifies air from a machining center.

It is common to employ machining centers within industrial plants. Such machining centers often include milling machines, screw machines, grinding machines or the like. A liquid usually cools the machining tool and workpiece within each machining center while also removing machined metal chips, dirt and other contaminants. This coolant liquid then flows into an underground flume for filtering and recycling. However, the heat and humid mist created by the hot cooling liquid cause the machining center environment to be uncomfortable and difficult to work in. This is especially prevalent when the machine center doors are opened to remove parts or change tooling.

In an initial attempt to overcome this hot air and humidity problem, a conventional industrial filter was mounted to the industrial plant floor over a flume opening. This filter drew in the mist and particulants from the flume for filtering. The filter contained an inlet plenum, impinger, prefilter, Vee bag frame, Vee bag filter, and a motorized blower. This conventional filter created a greater problem by discharging the hot and humid air from the normally closed machining centers into the remainder of the industrial plant. Accordingly, the air conditioning system within the plant became overloaded and the plant environment became extremely uncomfortable to work in due to the large number of such machining centers and corresponding filters. Despite requests, the filter manufacturers were unable to solve this problem with known devices.

In accordance with the preferred embodiment of the present invention, an air treating system filters and dehumidifies contaminated air within an industrial plant. In one aspect of the present invention, the air treating system includes a prefilter, a filter, a blower and a heat exchanger which cools and filters the contaminated air. In another aspect of the present invention, a self-contained filtering unit directly communicates with a flume which receives fluid carrying contaminated particles from a machining center. In yet another aspect of the present invention, multiple self-contained filter and dehumidifier units are coupled with a single air conditioning compressor and condenser unit. Methods of assembling and operating the present invention air treating system are also provided.

The air treating system of the present invention is advantageous over traditional industrial plant devices since the present invention filters and dehumidifies contaminated air within a single unit and in a very efficient manner. Thus, a more comfortable and productive industrial plant work environment is achieved without the necessity for enlarged and more expensive air conditioning compressor and condensing units. Furthermore, the mounting and direct communication of each filtering and dehumidifying unit in relation to the flume allows for more effective system performance while also creating a negative pressure within the flume for drawing the contaminated fluid away from the machining center. Additional advantages and features of the present invention will become apparent from the following description and appended claims, taken in conjunction with the accompanying drawings.

BRIEF DESCRIPTION OF THE DRAWINGS

FIG. 3 is a perspective view showing the preferred embodiment of the present invention air treating system.

DETAILED DESCRIPTION OF THE PREFERRED EMBODIMENT

Figure 1:
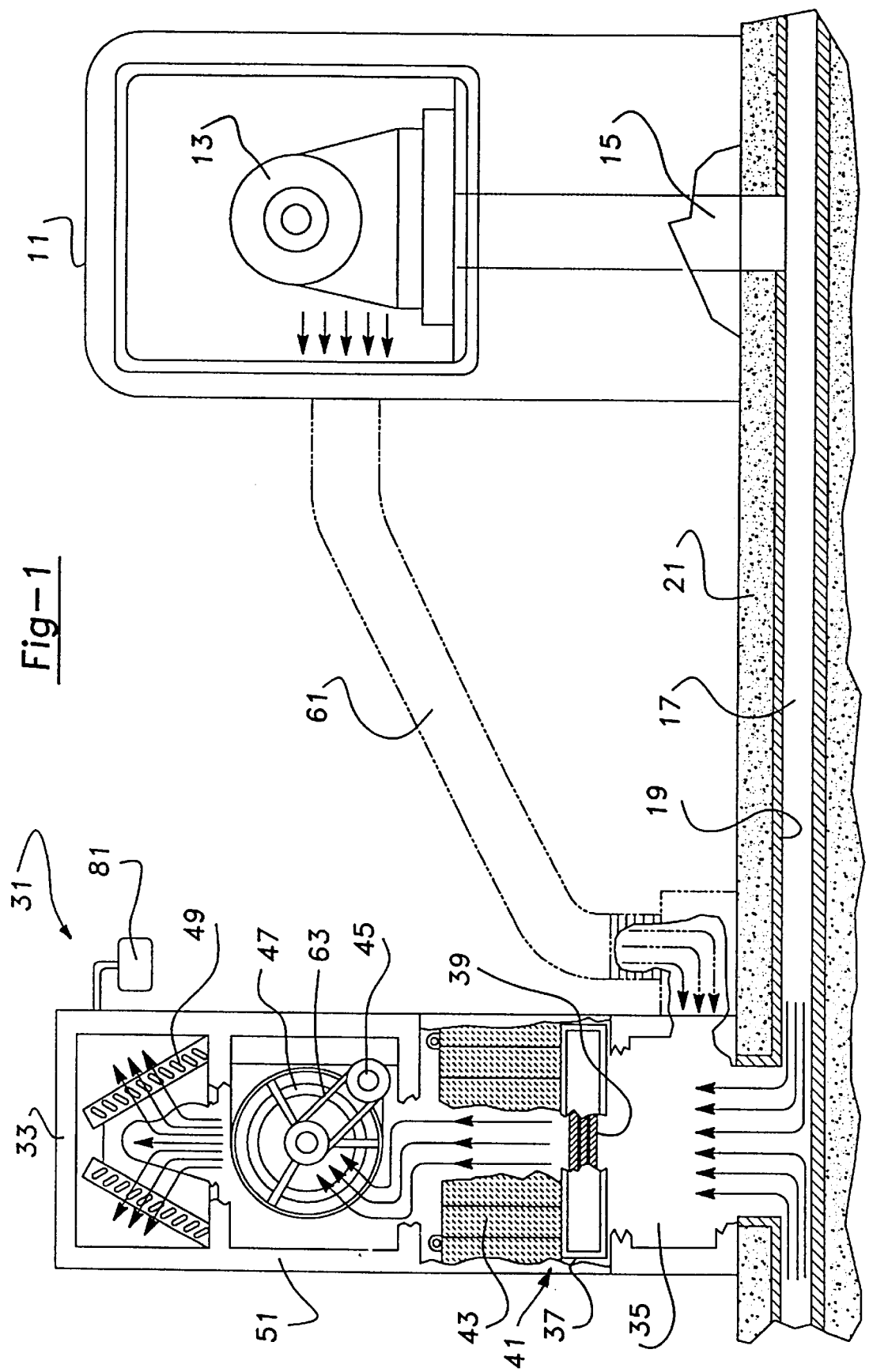
FIG. 1 is a schematic side view showing the preferred embodiment of an air treating system of the present invention.
Figure 2:
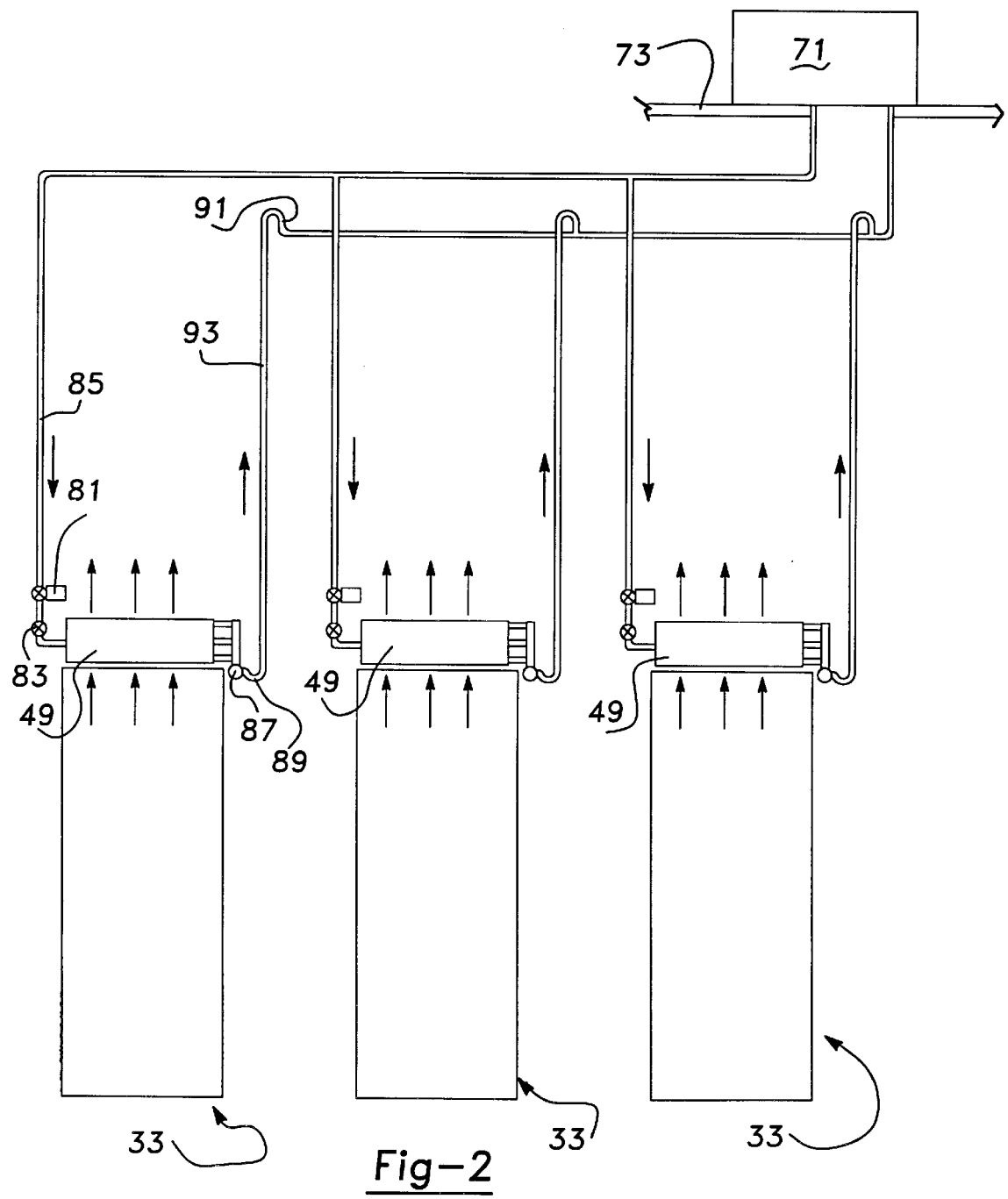
FIG. 2 is a schematic diagram showing the preferred embodiment of the present invention air treating system.

As can be observed in the figures, the industrial plant has a plurality of machining centers 11 which generate relatively hot and humid cooling fluid containing a water, chemical and hydraulic oil mixture. This liquid acts to cool a machining tool 13, and workpiece while also flushing away machined metal chips and dirt contaminants. The cooling liquid then travels down a generally vertical conduit 15, disposed within the machining center 11, and through a connected underground flume 17. This cooling liquid flows as both a liquid and an aerated mist and is heated to approximately 90° to 95° Fahrenheit by the machining center. Flume 17 is constructed as a series of interconnected tunnels, lined with steel 19 and embedded within the concrete plant floor 21. Remotely located flume filters and fluid pumping devices (not shown) are coupled to flume 17.

An air treating system 31 of the present invention is also provided. The preferred embodiment of air treating system 31 is comprised of a self-contained filtering and dehumidifying unit 33 corresponding to each machining center 11. Filtering and dehumidifying unit 33 has an inlet plenum 35, an impinger 37, a prefilter 39, a Vee bag frame 41, a Vee bag filter 43, an electric motor 45, a blower 47, an evaporator 49 and air flow outlets (not shown). A compartmented metal casing 51 surrounds and protects filtering and dehumidifying unit 33. A bottom aperture of inlet plenum 35 is preferably in direct communication with flume 17. In an alternate embodiment, an externally mounted duct 61 may supplement or replace conduit 15. This external duct 61 provides a hot and humid air and mist flow path between machining center 11 and a side aperture of inlet plenum 35.

Inlet plenum 35 receives the contaminated air and mist from the cooling liquid (hereinafter referred to as the fluid). Impinger 37 consists of angled venetian blind-like metallic louvres or angled aluminum vanes which act to redirect the air flow for gathering large and heavier moisture and contaminant particles to prevent filter saturation. The particles strike or are impinged upon the vanes and are separated from the air flow such that the impinger acts as an inertial separator. Furthermore, prefilters 39 consist of steel wool-like aluminum mesh filters for removing smaller particles and a small amount of moisture. Vee bag filter is constructed from a pleated fabric-like material arranged in an accordion manner upon bars. Motor 45 is of a 3–7 horsepower variety with an adjustable sheave for air flow control. This motor 45 drives a squirrel cage blower 47 by way of a drive belt 63. Blower 47 acts to draw the contaminated fluid sequentially through inlet plenum 35, impinger 37, prefilter 39 and filter 43. Blower 47 then serves to push this filtered fluid through A-coil evaporator 49. The filtering portion of unit 33 is constructed similar to the device disclosed within U.S. Pat. No. 5,342,433 entitled "Dust Collector with Bimodal Shaker" which issued to Avondoglio on Aug. 30, 1994 and is incorporated by reference herewithin.

Evaporator 49 is preferably a three ton Fraser-Johnston® Heatcraft evaporator model GCUA036S which has a pair of inwardly angled upflow evaporator coil banks. Evaporator 49 employs staggered rows of copper tubes which are mechanically expanded into aluminum fins for providing optimum air-to-surface contact for cooling and removing a significant amount of moisture from the air passing therethrough.

It has been found that a single ten ton air conditioning compressor and condensing unit 71, remotely mounted upon a plant roof 73, can suitably be coupled to three separate filtering and dehumidifying units 33. Unit 71 is preferably a Copelaweld™ F3AH-1000, 10 horsepower, dual fan, air-cooling condensing unit which can be purchased from Copeland Corporation. Other compressor and condensing units may be employed such as that disclosed within U.S. Pat. No. 4,471,633 entitled "Condensing Unit" which issued to Tinsler on Sep. 18, 1984, which is incorporated by reference herewithin. Compressor and condensing unit 71 operates around the clock, however, it is also envisioned that randomly cycled units may be used for a single, individually coupled filtering and dehumidifying unit 33. ⅞, 1⅛ and 1⅜ inch diameter copper tubing couples air conditioning compressor and condensing unit 71 to each evaporator 49. An expansion valve thermostat 81 and first ball shutoff valve 83 are placed within each refrigerant inflow tube 85. A second ball shutoff valve 87, an oil collecting P-trap 89 and a secondary oil trap 91 are further placed within each refrigerant outflow tube 93.

It has been found that the present invention air treating system can cool the air temperature flowing therethrough from 90° to 65°–73° Fahrenheit and from 85–90% humidity to 50% humidity. Accordingly, approximately 2½ gallons of condensate is removed each hour per unit and returned to the flume. Thus, 24 filtering and dehumidifying units have been found suitable for comfortable use in an approximately 70,000 square foot factory floor space area containing 24 machining centers using cooling liquid. Moreover, it should be noted that the air flow within the filtering and dehumidifying unit had to be significantly reduced to achieve proper evaporator performance. Also, fan cycling and discharge base valves were added to the compressor and condensing unit.

While the preferred embodiment of the air treating system has been disclosed, it should be appreciated that various other modifications can be made without departing from the spirit of the present invention. For example, various other filtering and/or impinger constructions can be used. Furthermore, the specific order of filtering, blower and evaporator components can be varied. Various materials have been disclosed in an exemplary fashion, however, other materials may of course be employed. It is intended by the following claims to cover these and any other departures from the disclosed embodiments which fall within the true spirit of this invention.

The invention claimed is:

1. An air treating system for use in an industrial plant, said air treating system comprising:
   a first prefilter;
   a first impinger;
   a first filter;
   a first evaporator;
   a first blower causing air to flow through said first prefilter, said first impinger, said first filter and said first evaporator;
   a single air conditioning compressor and condenser unit in fluid communication with said first evaporator such that said first evaporator acts as a dehumidifier;
   a first self-contained unit containing said first prefilter, said first impinger, said first filter, said first blower and said first evaporator;
   a second self-contained unit containing a second prefilter, a second filter, a second blower and a second evaporator;
   a third self-contained unit containing a third prefilter, a third filter, a third blower and a third evaporator;
   at least one conduit for transporting said air which carries said contaminated particles, said blower drawing said air from said at least one conduit and through said prefilter; and
   a machining center communicating with said at least one conduit for transmission of said air carrying said contaminated particles;
   wherein said air conditioning compressor and condenser unit is remotely located on a roof of said plant;
   wherein said first evaporator, said first blower, said first filter and said first prefilter are located in said plant; and
   wherein said first, second and third self-contained units all communicate with said single air conditioning compressor and condenser unit, said self-contained units all are spatially separated from each other;
   whereby contaminated particles are removed from said air, said air is dehumidified, and said air is cooled.

2. The system of claim 1 wherein said evaporator includes a pair of evaporator coil banks inclined toward each other.

3. The system of claim 1 further comprising an inlet plenum, wherein said air sequentially flows from said inlet plenum, through said first prefilter, through said first filter, through said first blower and through said first evaporator.

4. The system of claim 3 further comprising:
   a set of angled vanes of said first impinger separating contaminants, said first impinger disposed between said inlet plenum and said filter; and
   a generally vertically hanging bag filter of said first filter being arranged in an accordion manner.

5. The system of claim 1 wherein said air conditioning compressor and condenser unit is in fluid communication with said evaporator such that said evaporator acts as a dehumidifier.

6. A system for use in an industrial plant, said system comprising:
   a machining center generating fluid carrying contaminated particles, said fluid including a liquid;
   a flume located under a floor of said plant and transporting said fluid from said machining center;
   a self-contained unit including an inlet plenum, a filter, an impinger, a blower and a cooling device, said unit being entirely disposed above said floor; and
   an outlet disposed in said unit;
   said inlet plenum being positioned above said flume, said inlet plenum directly communicating with said flume for receiving said fluid;
   said blower causing said fluid to pass through said filter for removing contaminants within said fluid;
   said cooling device cooling said fluid prior to expulsion from said outlet;
   said impinger being positioned above said inlet plenum, said filter being positioned substantially above said impinger, said blower being positioned above said filter, and said cooling device being generally positioned above said blower; and
   an air conditioning compressor and condenser unit remotely located from and coupled to said self-contained unit.

7. The system of claim 6 further comprising an air conditioning compressor and condenser unit being in fluid communication with said cooling device, said cooling device including an evaporator acting as a dehumidifier.

8. The system of claim 7 further comprising:

a first self-contained unit containing a first impinger, said first filter, said first blower and said first evaporator;

a second self-contained unit containing a second impinger, a second filter, a second blower and a second evaporator;

a third self-contained unit containing a third impinger, a third filter, a third blower and a third evaporator; and at least one flume;

said first, second and third units all communicating with said at least one flume and also all communicating with said air conditioning compressor and condenser unit.

9. The system of claim 6 wherein said cooling device is an evaporator having a pair of coils angled toward each other.

10. An air treating system for use in an industrial plant, said system comprising:

a prefilter;

an impinger;

a filter;

an evaporator;

a blower causing air to flow through said prefilter, said impinger, said filter and said evaporator; and said prefilter, impinger, filter, evaporator and blower being substantially vertically disposed in relation to each other and self-contained within a single unit, said unit having a greater height than width;

whereby contaminated particles are removed from said air and at least 20% humidity is removed from said air, said air being expelled from said unit into said plant.

11. The system of claim 10 further comprising:

a flume;

a pair of evaporator coil banks being inclined toward each other; and an inlet plenum being positioned above said flume;

said impinger being positioned above said inlet plenum;

said filter being positioned substantially above said impinger;

said blower being positioned above said filter;

said evaporator being generally positioned above said blower.

12. The system of claim 10 wherein said evaporator cools said air being expelled from said single unit.

13. The system of claim 12 further comprising an air conditioning compressor and condensor unit being remotely located from said single unit and being coupled to said evaporator.

* * * * *

UNITED STATES PATENT AND TRADEMARK OFFICE
CERTIFICATE OF CORRECTION

PATENT NO. : 5,772,710      Page 1 of 2
DATED      : June 30, 1998
INVENTOR(S): Larry A. Bauer et al It is certified that error appears in the above-indentified patent and that said Letters Patent is hereby corrected as shown below:

On the Title Page, under Other Publications, lines 1, 2, "Temoperature" should be -- Temperature --.

Column 4, line 3, after "transporting" delete "said".

Column 4, line 4, after "carries" delete "said" (first occurrence).

Column 4, line 4, after "drawing" delete "said".

Column 4, line 8, after "of" delete "said".

Column 4, line 8, after "carrying" delete "said".

Column 4, line 19, after "from" delete "said".

Column 4, line 20, after "air" (first occurrence) delete "said".

Column 4, line 20, after "and" delete "said".

Column 6, line 3, after "from" delete "said".

Column 6, line 4, after "from" delete "said".

Column 6, line 5, "air" delete "said" (first occurrence).

Column 6, line 9, after "banks" delete "being".

UNITED STATES PATENT AND TRADEMARK OFFICE
CERTIFICATE OF CORRECTION

PATENT NO. : 5,772,710
DATED : June 30, 1998
INVENTOR(S) : Larry A. Bauer et al

It is certified that error appears in the above-indentified patent and that said Letters Patent is hereby corrected as shown below:

Column 6, line 11, after "plenum" delete "being".

Column 6, line 21, delete "said" (first occurrence).

Column 6, line 21, after "air" delete "being".

Column 6, line 23, delete "being".

Signed and Sealed this

Seventeenth Day of November, 1998

Attest:

BRUCE LEHMAN

*Attesting Officer*    *Commissioner of Patents and Trademarks*